(12) United States Patent
Bishop

(10) Patent No.: US 6,536,501 B1
(45) Date of Patent: Mar. 25, 2003

(54) TIRE CHANGING AND BEAD BREAKER APPARATUS

(76) Inventor: Kenn Bishop, 530 Valley Rd., Moses Lake, WA (US) 98837

( * ) Notice: Subject to any disclaimer, the term of this patent is extended or adjusted under 35 U.S.C. 154(b) by 0 days.

(21) Appl. No.: 09/974,880

(22) Filed: Oct. 10, 2001

(51) Int. Cl.⁷ .............................................. B60C 25/132
(52) U.S. Cl. ...................... 157/1.28; 157/1.24; 157/20
(58) Field of Search ............... 157/1.17, 1.22, 157/1.24, 1.26, 1.28, 20

(56) References Cited

U.S. PATENT DOCUMENTS

| | | | |
|---|---|---|---|
| 3,818,967 A | * 6/1974 | Dunn | 157/1.22 |
| 3,867,975 A | 2/1975 | Johnson | 157/1.2 |
| 4,263,958 A | 4/1981 | Corless | 157/1.1 |
| 4,293,120 A | 10/1981 | Robins | 254/50.2 |
| 4,415,014 A | 11/1983 | Turpin | 157/1.28 |
| 4,417,614 A | * 11/1983 | Cunningham et al. | 157/1.24 |
| 4,641,699 A | 2/1987 | Giles | 157/1.17 |
| 4,694,875 A | * 9/1987 | Goebel | 157/1.17 |
| 4,733,705 A | 3/1988 | Dwiggins | 152/177 |
| 4,750,538 A | * 6/1988 | du Quesne | 157/1.24 |
| 4,787,433 A | 11/1988 | Thomas | 157/1.17 |
| 4,804,030 A | 2/1989 | Mandelko | 157/1.17 |
| 4,846,239 A | * 7/1989 | Heller et al. | 157/1.24 |
| 4,848,731 A | 7/1989 | Ringo | 254/50.1 |
| 4,884,611 A | 12/1989 | Schmidt | 157/1.24 |
| 4,947,918 A | 8/1990 | Unrau | 157/1.22 |
| 5,009,257 A | 4/1991 | Reeves | 157/1.26 |
| 5,226,465 A | * 7/1993 | Schon et al. | 157/1.2 |
| 5,269,358 A | 12/1993 | Ling | 157/1.17 |
| 5,421,392 A | 6/1995 | Unrau | 157/1.17 |
| 5,649,582 A | 7/1997 | Hjorth-Hansen | 157/19 |
| 5,876,526 A | 3/1999 | Hamade et al. | 152/416 |
| 5,971,052 A | 10/1999 | Kliskey | 157/1 |

* cited by examiner

Primary Examiner—James G. Smith
Assistant Examiner—Hadi Shakeri
(74) Attorney, Agent, or Firm—Liebler, Ivey & Connor; Floyd E. Ivey

(57) ABSTRACT

An apparatus for the mounting/dismounting of tires on wheels. A bead breaker module with elongated pressure clamps pivotally moved by an actuator such that the elongated pressure clamps extend from the perimeter of a tire to a position proximal the tire side and bead; the actuator urges the elongated pressure clamps together to disengage the bead from the rim. A time mount/dismount module having a base plate affixed to a wheel; a receiver and drive assembly rotatably affixed to the base plate with a receiver receiving a bead rolling tool which is inserted between a tire bead and wheel rim and which, when the receiver and drive assembly is rotated, disengages the bead from the rim or, when installing a tire, engages the bead relative to the rim.

11 Claims, 7 Drawing Sheets

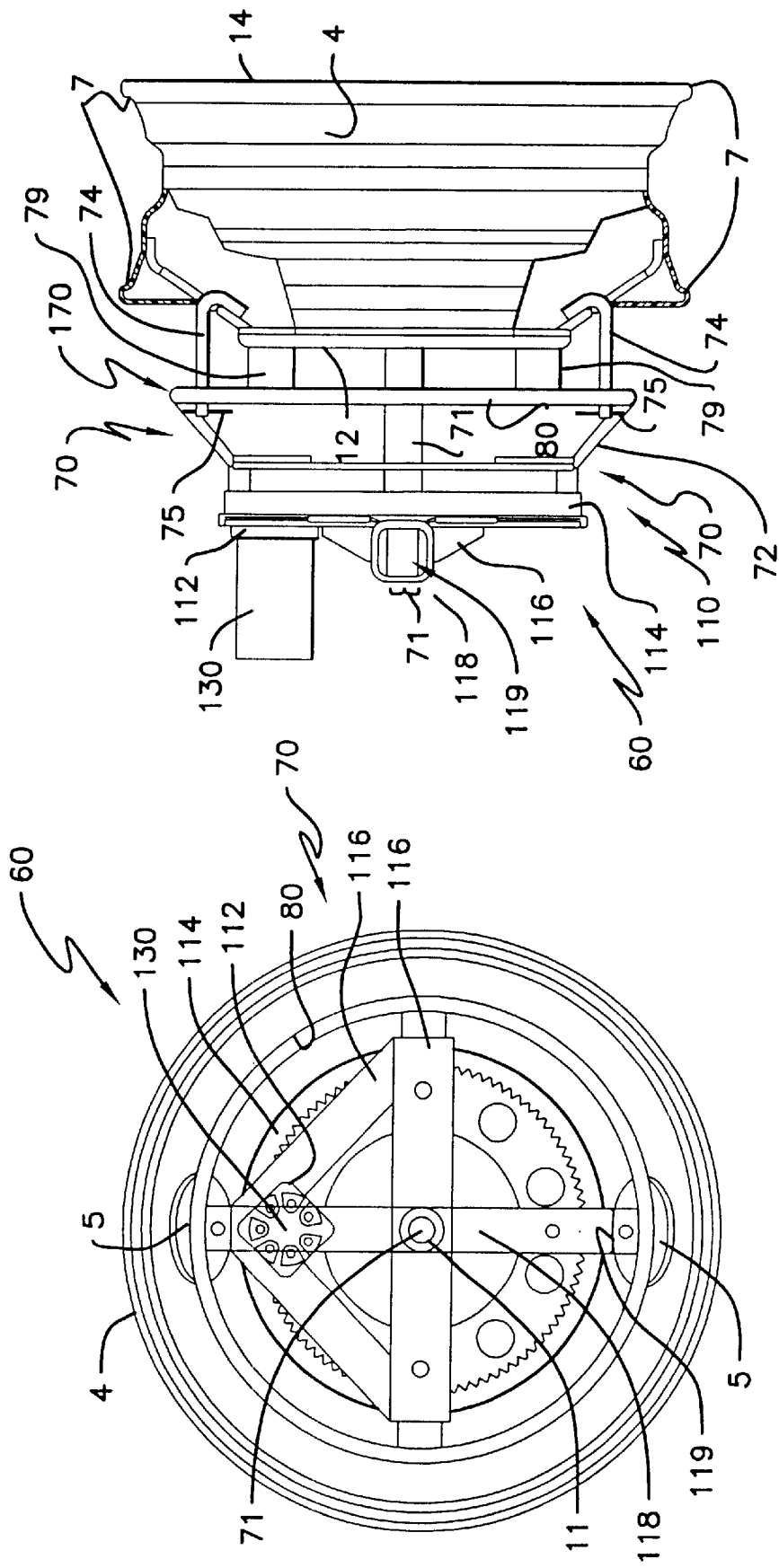

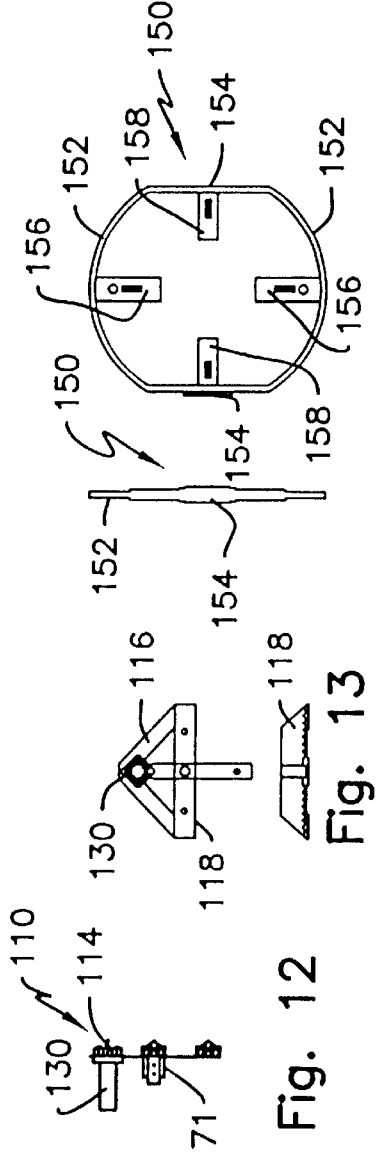
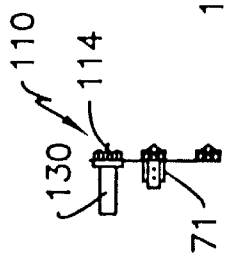
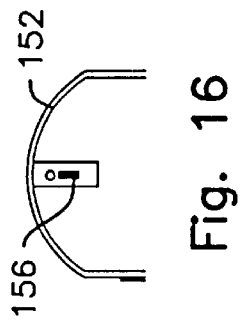
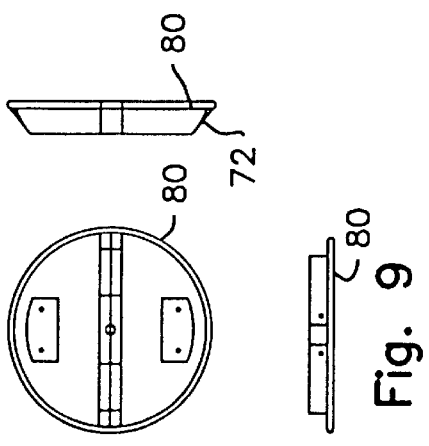
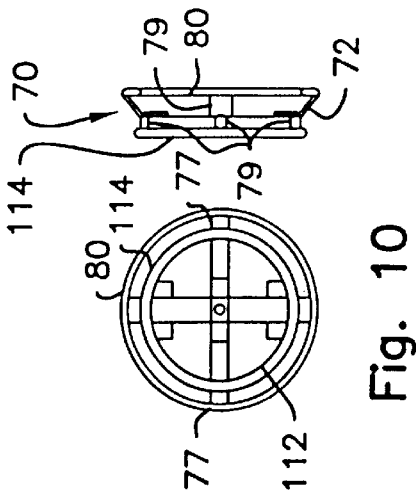

TIRE CHANGING AND BEAD BREAKER APPARATUS

FIELD OF THE INVENTION

The present disclosure relates to changing automotive and vehicle tires. The apparatus relates in particular to bead breaking and mounting/dismounting truck tires.

BACKGROUND OF THE INVENTION

Truck tire failure poses time, labor and transit delay. Historical practices required transport of replacement tires and tire changing equipment imposing the labor on the driver of changing the failed tire. More recently trucking companies have provided for communication means allowing a driver to notify a central facility to send assistance. The changing of a truck tire while on the road, by one with experience, requires approximately 20–40 minutes. Tire sales and service companies, having automated equipment, experience truck tire changing at the rate of approximately three per hour. A medium sized tire service company may change forty to fifty truck tires per day requiring sufficient staff for such labor. U.S. Pat. No. 4,884,611 to Schmidt discloses a tire changing machine; U.S. Pat. No. 5,269,358 to Ling discloses a tire bead loosening tool and universal rim adapter; U.S. Pat. No. 5,876,526 Hamade et al discloses an automotive flat tire repair system improvement; U.S. Pat. No. 4,804,030 to Mandelko discloses a tire bead separator; U.S. Pat. No. 4,263,958 discloses a tire mounting, bead seating and inflation apparatus and method of use; U.S. Pat. No. 5,971,052 discloses a tire mount/dismount bar; U.S. Pat. No. 5,421,392 to Unrau discloses a tire bead breaker; U.S. Pat. No. 5,009,257 to Reeves discloses a tire breaker apparatus for all-terrain vehicle tires; U.S. Pat. No. 4,947,918 to Unrau discloses a tire changer; U.S. Pat. No. 4,641,699 to Giles et al discloses a tire bead breaking device; U.S. Pat. No. 4,415,014 to Turpin discloses a bead breaking tool; U.S. Pat. No. 4,848,731 to Ringo discloses a tire casing spreader; U.S. Pat. No. 4,263,958 to Corles discloses a tire mounting, bead seating and inflation apparatus and method of use; U.S. Pat. No. 5,649,582 discloses a bead breaking apparatus; U.S. Pat. No. 3,867,975 to Johnson discloses a tire changing tool; U.S. Pat. No. 4,787,433 to Thomas discloses a bead breaking device for tractor tires.

The foregoing patents and printed publications are provided herewith in an Information Disclosure Statement in accordance with 37 CFR 1.97.

SUMMARY OF THE INVENTION

Changing a tire requires the damaged or worn tire to be removed from a wheel and a replacement tire mounted on the wheel. A tire changing and bead breaker apparatus is disclosed. The first act requires the tire bead, at both sides of the tire, to be disengaged from both sides of the wheel rim. A tire bead breaker module is disclosed comprised of at least two elongated pressure clamps terminating in bead pad clamps. The at least two elongated pressure clamps straddle a tire at the tire perimeter, which is concentric with the wheel center, positioning the at least two bead pad clamps proximal the tire rim and tire side proximal the tire bead. The pressure clamps are urged toward each other thus applying pressure to the tire at both sides and moving the tire side at the bead to disengage the bead from the tire rim. The pressure clamps, having clamp first and second ends, are pivotally mounted on a mounting bar. The bead pad clamps are urged toward the opposing bead pad clamp, in the preferred embodiment, by a hydraulic actuator positioned between and attached to the clamp second ends. A clamp stop pin positioned intermediate a pressure clamp first end and the pivot point at the mounting bar will encounter the mounting bar and stop movement of that pressure clamp to allow the opposing pressure clamp to continue movement and thus insure disengagement of both tire beads from the rim.

Upon disengagement of the bead from the rim, a tire mount/dismount module is employed as disclosed here. In the preferred embodiment, the tire mount/dismount module is installed as the initial step in changing the tire. In the preferred embodiment, the tire changing and bead breaker apparatus is stabilized by the receiver of the tire mount/dismount module as the preliminary step to breaking the bead from the tire rim. The tire mount/dismount module is affixed to the wheel by insertion of "J" bolts through slots in a base plate assembly, into the wheel hands allowing tightening of wing nuts, on the threaded "J" bolts, and thus securing the base plate assembly to the wheel. The base plate assembly, in the preferred embodiment, remains fixed and stationary during the operation of the apparatus. A receiver and drive assembly, positioned by the base plate assembly, has a receiver which receives a standard tire bead rolling tool. The tool is received into the receiver at one end while the opposing end is received between a tire bead and the tire rim. Rotation of the receiver and drive assembly, by a drive gear engagement with a stationary ring gear, causes the receiver and tire bead rolling tool to rotate around the wheel and tire bead perimeter thus performing either the removal or installation of the tire on the wheel. Both tire beads are addressed resulting in either mounting or dismounting of the tire from the wheel.

The disclosed tire changing and bead breaker apparatus is light weight, portable and substantially less expensive than prior art apparatuses. The disclosure is of an apparatus which, from commencement of attachment through bead breaking, tire removal and tire mounting, can accomplish the process in less than two (2) minutes. The apparatus may be used in tire shops as well as on the road by drivers. The application is of particular interest relative to truck tires.

BRIEF DESCRIPTION OF THE DRAWINGS

The foregoing and other features and advantages of the present disclosure will become more readily appreciated as the same become better understood by reference to the following detailed description of the preferred embodiment and additional embodiments of the disclosure when taken in conjunction with the accompanying drawings, wherein:

FIG. 5 illustrates a plan view of a wheel with the tire mount/dismount module in place. Seen is the wheel, hand, base plate assembly, center shaft, receiver and drive assembly, moveable rotating drive means, stationary rotating means, frame, receiver and drive means. This view shows the wheel front and wheel center.

FIG. 6 is side elevation of the tire mount/dismount module showing, in addition to that shown in FIG. 5, the frame support, base plate assembly wheel attachment and nut, spacing and affixing means, base ring and frame.

FIG. 9 shows a plan view, side and front elevations which illustrates a portion of the base plate assembly showing the base ring and slots.

FIG. 10 shows a plan view and side elevation illustrating a portion of the base plate assembly showing the stationary rotating means and spacing and affixing means.

FIG. 12 is a side elevation of the receiver and drive assembly showing the moveable rotating drive means, frame and drive means.

FIG. 13 is a plan view of FIG. 12 showing the frame, drive means, receiver and center shaft.

FIG. 14 is a plan and elevation of a bead rolling tool.

FIG. 15 is a plan and side elevation of the rim adapter showing the rim adapter frame, tubes, rim connector and tube lever.

FIG. 16 is a plan view of a semi-circular segment of the rim adapter frame.

DETAILED DESCRIPTION

Figure 2:
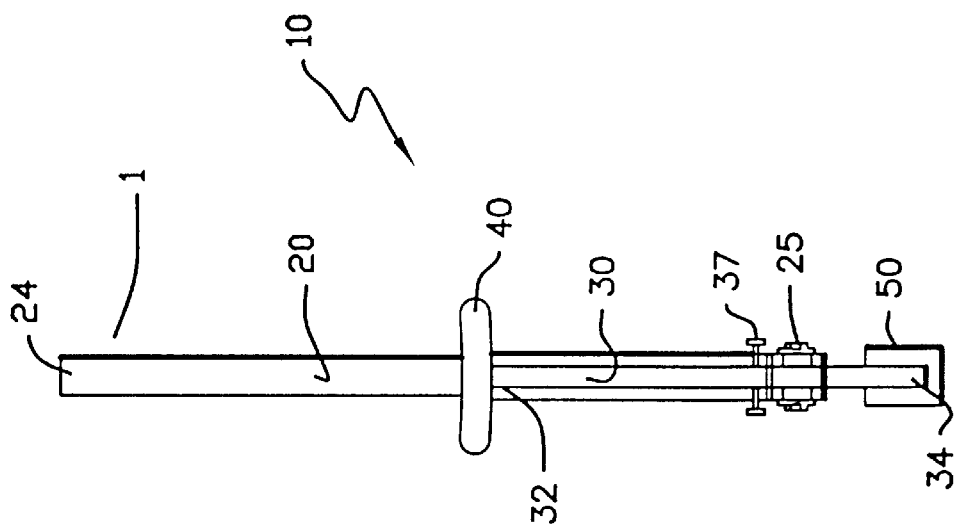
FIG. 2 is a side elevation of the bead breaker module.
Figure 1:
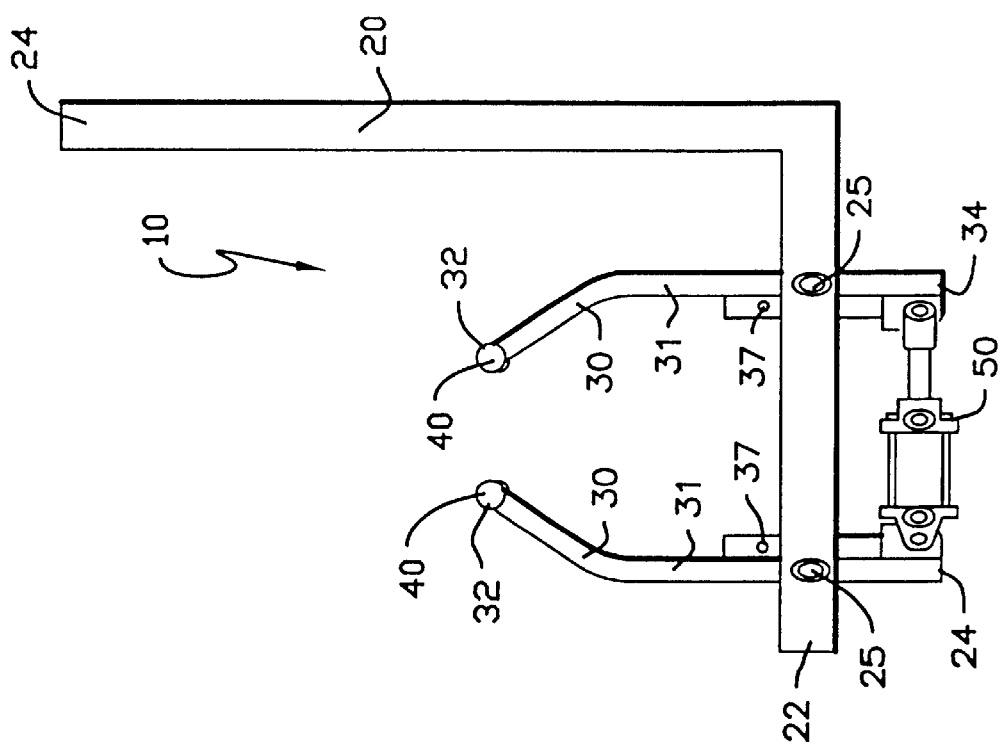
FIG. 1 is a plan view of the tire bead breaker module illustrating the mounting bar, mounting bar first and second ends, pivot points, pressure clamps, elongated members, clamp first and second ends, clamp stop pin, bead par clamps and actuator.
Figure 3:
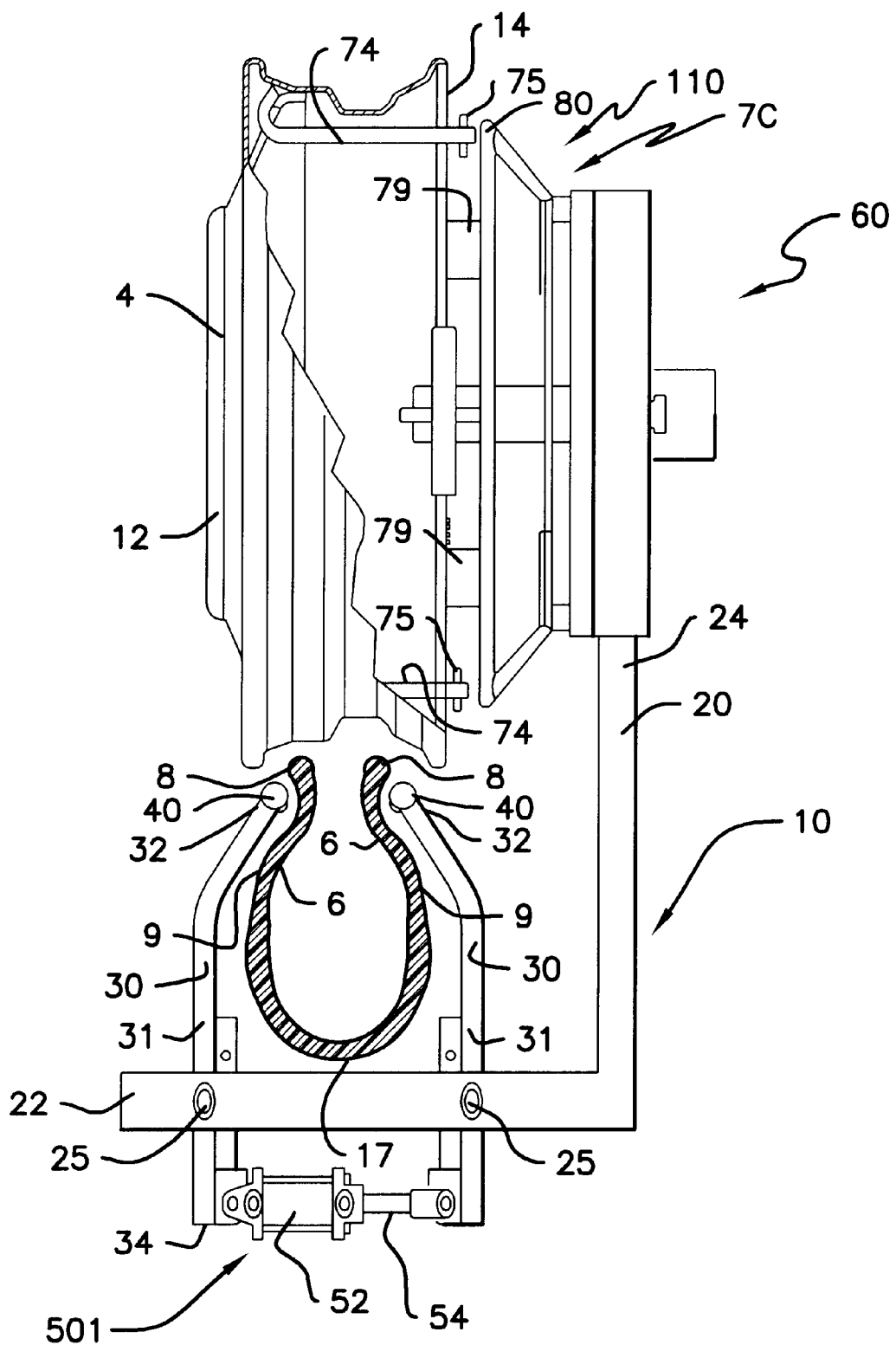
FIG. 3 is a plan view of the bead breaker module relative to a wheel showing the pressure clamps in the closed position as seen when breaking the beads of a tire from engagement with the rim of a wheel. Illustrated is the mounting bar received into a receiver as a means of stabilizing the mounting bar during operation of the bead breaker module. Shown is the perimeter of the tire.
Figure 4:
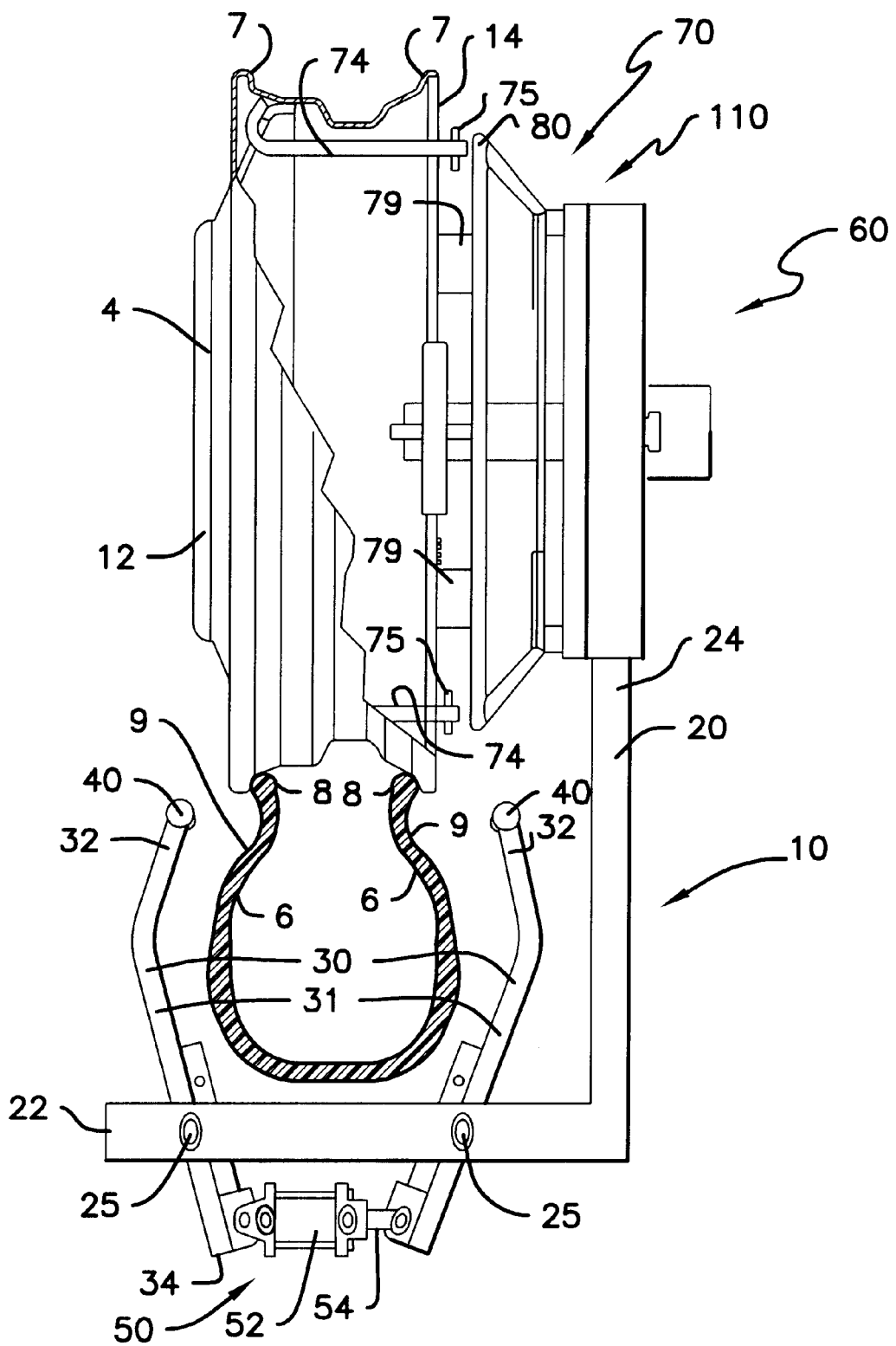
FIG. 4 is a plan view as in FIG. 3 showing the pressure clamps in the open position.

The Tire Changing and Bead Breaker Apparatus is depicted in FIGS. 3 and 4 showing the tire bead breaking module (10) and the tire mount/dismount module (60). FIGS. 1, 2, 3 and 4 illustrate the tire bead breaking module (10) showing the mounting bar, mounting bar first and second ends, pivot points, pressure clamps, elongated members, clamp first and second ends, clamp stop pin, bead par clamps and actuator.

FIGS. 3, 4, 5, 6, 7 and 8 illustrate a wheel with the tire mount/dismount module in place. Seen is the wheel, hand, base plate assembly, center shaft, receiver and drive assembly, moveable rotating drive means, stationary rotating means, frame, receiver and drive means. Also seen are the wheel front, rear and center. The tire with perimeter, sides and beads is demonstrated in FIGS. 3 and 7. FIG. 6 additionally shows the frame support, base plate assembly wheel attachment and nut, spacing and affixing means, base ring and frame.

Figures 7, 8:
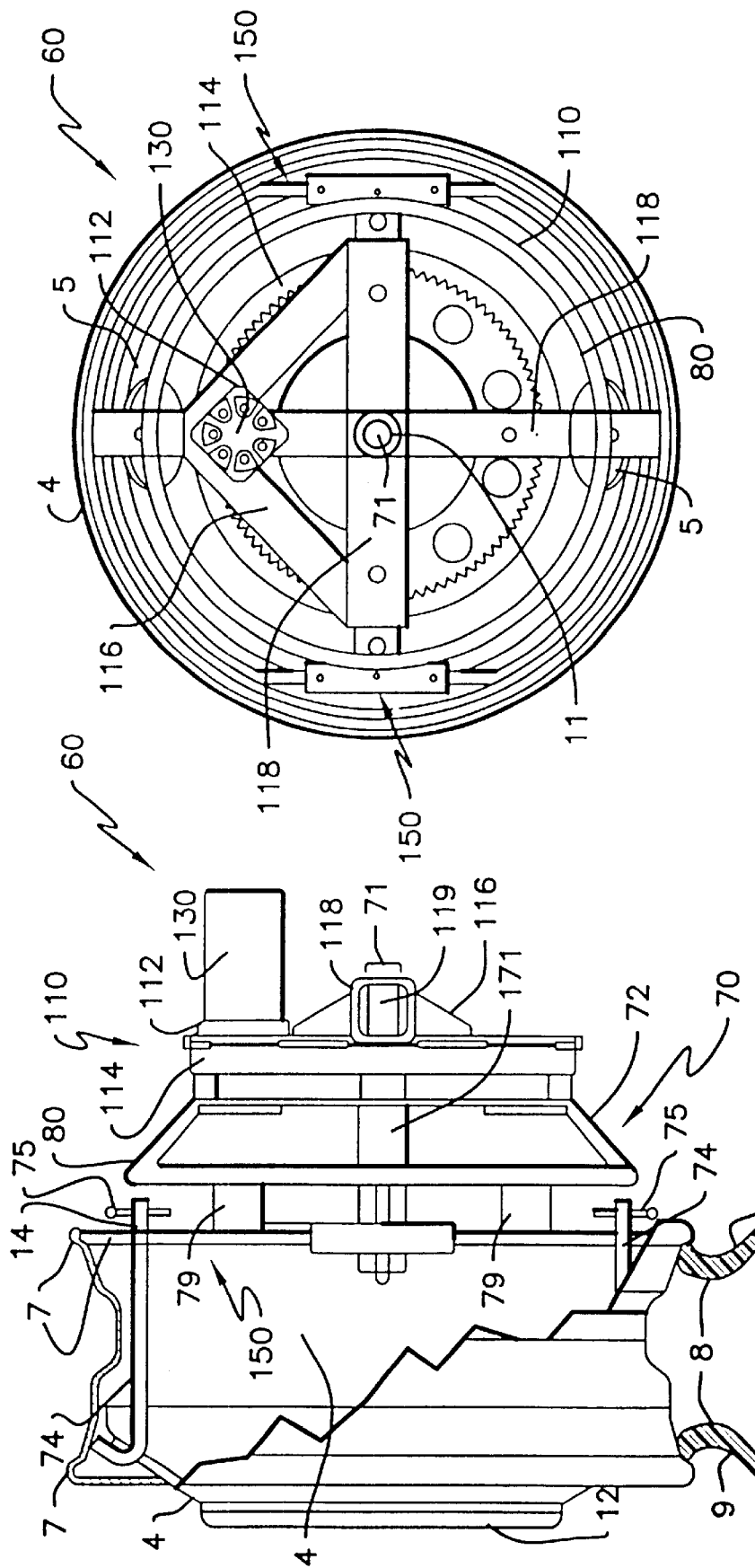
FIG. 7, in addition to that shown in FIG. 5, shows the wheel rear illustrating the rim adapter with rim adapter frame and tube. Also seen is the perimeter of the tire and wheel center.
FIG. 8 is a side elevation of FIG. 7.

FIG. 7 shows, for application of the invention to tire mounting/dismounting from the wheel rear, a rim adapter with rim adapter frame and tubes.

Figure 11:
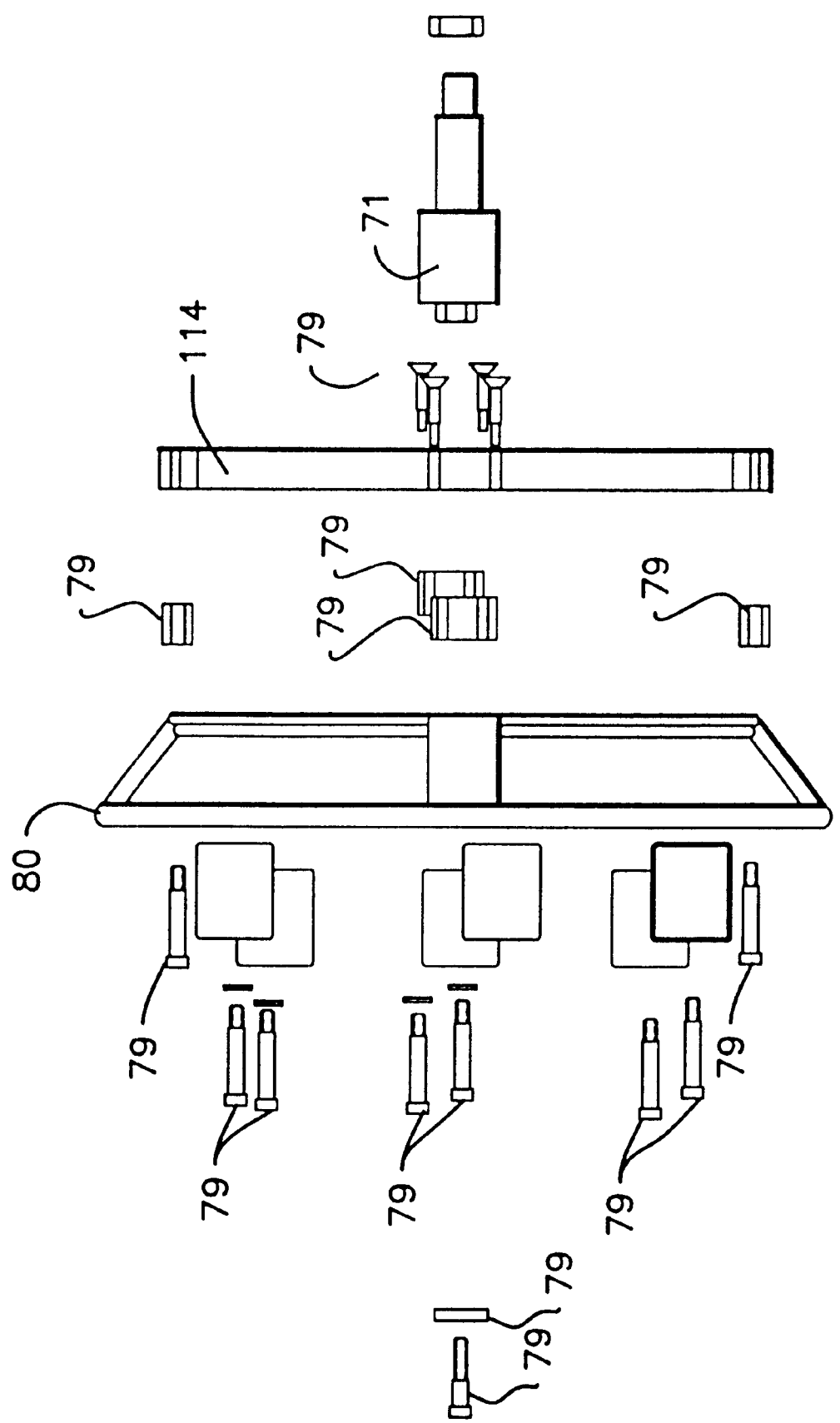
FIG. 11 is a side elevation showing the spacing and affixing means, the base plate assembly with frame support and the stationary rotating means. Also seen is the center shaft.

Details of the base plate assembly showing the base ring and slots, the stationary rotating means and spacing and affixing means, frame support and the stationary rotating means and center shaft are seen in FIGS. 9 through 11.

FIGS. 12 and 13 illustrate the receiver and drive assembly showing the moveable rotating drive means, frame, drive means, receiver and center shaft. FIG. 14 shows a plan and elevation view of a standard bead rolling tool. FIGS. 15 and 16 illustrate the rim adapter showing the rim adapter frame, tubes, rim connector and tube lever.

Tire Changing and Bead Breaker Apparatus: The tire changing and bead breaker apparatus comprises a tire bead breaker module (10) having bead breaking means to apply pressure to the both sides of a tire (6) having sides (9) and tire beads (8); the bead breaking means causing the tire bead (8) at each side of the tire (6) to disengage from the rim (7) of a wheel (4); the wheel (4) has a center (11) which is concentric with the perimeter (17) of the tire (6). In the preferred embodiment the bead breaking means is comprised of at least two pressure clamps (30); each at least two pressure clamps (30) having a clamp first and second end (32, 34); the at least two pressure clamps (30) positioned such that the respective clamp first ends (32) are proximal the respective tire side (9); each at least two pressure clamps (30) having a force means to urge the respective clamp first end (32) against the respective tire side (9). In the preferred embodiment a bead pad clamp (40) is affixed by affixing means proximal the respective clamp first ends (32); the bead pad clamp (40) is generally elongated and sized and oriented, in its attachment proximal the respective clamp first end, to be received at the tire (6) side (9) generally parallel with the rim (7). The bead pad clamp (40) will generally have a flat to convex surface which contacts the tire side with dimensions and shape which will be appreciated by those of ordinary skill in the tire arts such that damage to a tire side or sidewall will not be created by exerted pressure.

In the preferred embodiment each of the at least two pressure clamps (30) will be comprised of an elongated member (31) generally composing a shaft, rod or bar. The at least two pressure clamps (30) will be composed of a material having sufficient structural integrity as to allow forces great enough to disengage the tire bead from the wheel rim and will thus likely be formed of metal. However, other materials may be utilized including composite materials, including Carbon Fibre and Carbon-Carbon Composites, woods, laminated structures and other material recognized by those of ordinary skill in the art. In the preferred embodiment the at least two pressure clamps (30) have clamp first and second ends (32, 34) with the bead pad clamp (40) positioned proximal each of the clamp first ends (32).

It will be seen for the preferred embodiment, that the elongated member (31) is of a length such that the at least two pressure clamps (30) will straddle a tire (6) at the tire perimeter (17) such that the elongated member (31) extends the clamp first ends (32) toward and proximal the tire side (9) for proper placement of the bead pad clamp (40) proximal the tire side (9). Thus at the perimeter (17) the mounting bar (20), clamp second ends (34) and actuator (50) will be proximal the tire perimeter (17).

The at least two pressure clamps (30) are, in the preferred embodiment, mounted on a mounting bar (20) having a mounting bar first and a second end (22, 24); the at least two pressure clamps (30) are pivotally affixed by pivotally affixing means, intermediate the said clamp first and second ends (32, 34), to the mounting bar (20) such that one of said at least two pressure clamps (30) is proximal the mounting bar first end (22) and that one of said at least two pressure clamps (30) is intermediate the pivotally affixed pressure clamp (30) proximal the mounting bar first end (22) and the mounting bar second end (24); the at least two pressure clamps (30) pivotally affixed such that the respective clamp first ends (32) oppose each other and the respective clamp second ends (34) oppose each other; force means (50)

composed of an actuator (50) having means of extension and retraction is affixed proximal the clamp second ends (34) such that actuation of said actuator (50) causes the respective at least two pressure clamps (30) to pivot.

Those of ordinary skill in the actuator arts will appreciate that a variety of electric, hydraulic, pneumatic and other actuators providing movement by cylinder and piston, solenoid and shaft, gear means and other means are available for attachment to and providing force to cause the respective at least two pressure clamps (30) to pivot and to move toward and away from the other at the clamp first ends (32). It will be recognized that the actuator (50) may be positioned in other locations such as intermediate the clamp first ends and the mounting bar (20) and pivot point (25). Additionally, it will be seen that one or move actuators may be utilized providing, e.g., for an actuator (50) proximal each clamp first end (32) which urges force to extend or retract a bead bad clamp (40) toward or away from a tire (6) side (9). In the preferred embodiment force means (50) is comprised of at least one hydraulic, pneumatic or electric actuator (50) having a cylinder (52) and a piston (54); the actuator (50) affixed at the clamp second ends (34) such that the cylinder (52) is rotatably affixed proximal one of the clamp second ends (34) and the piston (54) is rotatably affixed proximal the opposing clamp second end (34); extension actuation of the at least one actuator (50) causing extension of the piston (54) causing the clamp first ends (32) to move toward each other and retraction actuation of the at least one actuator (50) causing retraction of the piston (54) causing the clamp first ends (32) to move away from each other. Actuator power means and control means are provided for operation of the actuator (50).

The movement of the at least two pressure clamps (30) toward each other is restricted by a clamp stop pin (37) located intermediate the clamp first end and second end (32, 34) positioned to contact the mounting bar (20), or other structure, intermediate the pivot point (25) and the clamp first end (32). Restriction of such movement of the at least two pressure clamp (30) allows the stopping of movement of the respective at least two pressure clamps (30) upon disengagement of the bead (8) on the tire side (9) of the restricted movement at least two pressure clamps (30) thereby allowing progression of the opposing at least two pressure clamps (30) in disengaging the bead (8) against which it bears. It will be appreciated that the clamp stop pin structure is such that encounters a structure and terminates movement. The structure may be a pin inserted in an aperture within the at least two pressure clamps (30) positioned to encounter the mounting bar (20), a machined or molded extension of materials from the at least two pressure clamps (30), a structure placed at the mounting bar (20) such as a bolt extended in the path of travel of the respective at least two pressure clamps (30) which limits movement and other equivalent structures.

The Tire Mount/Dismount Module: The operation of the Tire Mount/Dismount Module (60) is summarized as follows: a first element, disclosed here as base plate assembly (70), which is affixed to a wheel (4) so as to be immovable; a second element, disclosed here as a receiver and drive assembly (110), which is rotatably affixed to the first element and which has drive means to cause rotation of the second element relative to the first element; a third element, disclosed here as a receiver (118) which receives or which comprises a bead rolling tool (140); the bead rolling tool (140) is received between a wheel (4) and a tire bead (8); the bead rolling tool (140) turns as the second element is rotated thus disengaging the bead (8) from the wheel (4).

The tire mount/dismount module (60) has a receiver and drive assembly (110) rotatably affixed to a wheel (4) by affixing means. Provided is rotating means to rotate the receiver and drive assembly (110). A receiver (118) is affixed to the receiver and drive assembly (110) which receives or comprises a bead rolling tool (140) and positions the bead rolling tool (140) to be received between a rim (7) and a tire bead (8).

The tire mount/dismount module (60) has a base plate assembly (70) immovably secured to a wheel (4) by affixing means. The receiver and drive assembly (110) is rotatably affixed to the base plate assembly (70) with rotating means rotatably affixed to the receiver and drive assembly (110). Drive means (130) is seen to rotate the rotating means and the receiver and drive assembly (110). A frame (116) is affixed to and supports the receiver and drive assembly (110). The receiver (118) is affixed to the frame (116). It will be appreciated that the base plate assembly (70) is a frame or positioning means for securing, relative to the wheel (4), the receiver and drive assembly (110) such that the receiver and drive assembly (110) may rotate relative to the wheel (4) permitting the bead breaking means, seen here as a bead rolling tool (140), to move between a wheel rim (7) and tire bead (8). The structure of a wheel front (12) frequently differs from the structure of the wheel rear (14). A base ring The base plate assembly (70) which would be received at a wheel front (12) is not likely to mate with a wheel rear (14). It will be appreciated that the base plate assembly (70), functioning as a fixing means and frame means, may be formed in a variety of shapes and sizes, as indicated by the identification of a base ring (80) formed to be received by a wheel front (12) or rear (14) and as suggested later in this specification regarding the Rim Adapter (150). Whether denominated base ring (80) or Rim Adapter (150), such a structure will serve to fix the Tire Mount/Dismount Module (60) relative to a wheel (4) such that the receiver and drive assembly (110) may rotate relative to the wheel (4).

The wheel (4) has hands (5). The base plate assembly (70) is received by a wheel front (12) by a base ring (80) which serves as a frame member shaped and sized to contact a wheel front (12) for the stabilizing and securing of the base plate assembly (70) relative to the wheel (4). The base plate assembly (70) is immovably secured to at least one wheel (4) hand (5) by affixing means including, in the preferred embodiment, at least one bolt (74) and nut (75) wherein the at least one bolt (74) is received through slot or aperture means in the frame (116) and in a slot or aperture means in the wheel (4) and, in the preferred embodiment, at least one slot (77) in frame (116) and into the at least one wheel (4) hand (5). In the preferred embodiment the affixing means is comprised of at least one threaded "J" bolt secured, at the "J" end against the wheel (4) structure received through the hand (5) and with a wing nut at the slot (77) in the frame (116). Those of ordinary skill will recognize other means of securing the base plate assembly (70) against the wheel (4) such that the base plate assembly (70) does not move including, springs terminating in hooks, threaded bolts received in apertures within the wheel (4), spring loaded detent devices and other structures. While the preferred "J" bolt provides a simple and rapid solution to the interconnection, other devices will suffice.

The application of the Tire Mount/Dismount Module (60) at a wheel (4) rear (14) may require an additional frame member which is received by the wheel rear (14) with means of securing the frame member to the wheel (4) at the rear (14) and which provides interconnection means to receive and secure the base plate assembly (70) to be immovable relative to the wheel (4). It will be appreciated that the affixing means discussed herein relative to the securing of the base plate assembly (70) at a wheel front (12) will additionally apply generally to the fixing of an additional frame member and the base plate assembly (70) to a wheel rear (14). The base ring (80) of the base plate assembly (70) is a frame member which may be of a variety of shapes and sizes depending upon factors such as the wheel (4) shape/construction most often encountered. Any deviation from the wheel (4) front or rear (12, 14) from that which will receive the base ring (80) may require an additional frame member to act as an adapter between the wheel (4) and base plate assembly (70). A review of FIGS. 7, 8, 15 and 16 illustrate one embodiment of an additional frame member, named here a rim adapter (150), to facilitate the fixing, by fixing means, of the base plate assembly (70) to the wheel (4).

The rotating means comprised of a movable rotating drive means (112) rotatably interrelated to a stationary rotating means (114) and the movable rotating drive means (112) is rotatably affixed to the receiver and drive assembly (110). The movable rotating drive means (112) is, in the preferred embodiment, comprised of a drive gear rotatably interrelated to a stationary rotating means (114) comprised, in the preferred embodiment, of a stationary ring gear (114). In the preferred embodiment the movable rotating drive means (112) is rotated by at least one drive means (130) composed, for example, by an electric, hydraulic and or pneumatic motor which rotates the drive gear (112) which is in gear contact with the stationary ring gear (114) thereby causing the drive means (130), movable rotating drive means (112) or drive gear (112) to move. The receiver (118) is affixed to a frame (116) which is rotated as the drive gear (112) is rotated. The Figures depict the drive means (130) as extending from the frame (116). Those of ordinary skill in the machine arts will appreciate that the structure of rotating one structure in relation to another may be accomplished by a variety of methods including, e.g., by a pulley and belt means, a rachet means and by other methods. It will be appreciated that the at least one movable rotating drive means (112) may be the equivalent of or provide an equivalent function as a ring gear (112) which rotates while a drive gear or stationary rotating means (114) remains stationary. Those of ordinary skill in the art will recognize that the rotating means including drive means (130) may be positioned central to the Tire Mount/Dismount Module (60) with rotating drive means (112) rotatably interrelated to a stationary rotating means (114) structured such that the rotating drive means (112) is a drive gear interrelated to a ring gear and, where desired, to a center shaft (71) or constitutes other rotating means interrelated to gear means and or a center shaft (71).

The device is assembled with spacing and affixing means (79), as will be appreciated by those of ordinary skill in the art, for the interconnection of the base plate assembly (70) with the wheel front or rear (12, 14) and of the base plate assembly (70) and receiver and drive assembly (110). In the preferred embodiment a center shaft (71) is centrally positioned in relation to the concentrically related base plate assembly (70) and receiver and drive assembly (110) around which the receiver and drive assembly (110) revolve. It will be seen that the center shaft (71) depicted in the preferred embodiment is not a limiting structure and that there need be no center shaft (71) but rather the rotatable interrelationship of the immovable base plate assembly (70), relative to the wheel (4), or its equivalent and the receiver and drive assembly (110) or its equivalent, e.g., the relationship between the base plate assembly (70) and the receiver and drive assembly (110) may be determined by the interconnection or interrelationship of drive means elements including rotating and stationary elements. Such is seen between moveable rotating drive means (112) and stationary rotating means (114).

The receiver (118) is, in the preferred embodiment, comprised of a tubular structure forming an aperture denoted here as a bead rolling tool aperture (119) which will receive an end of a standard bead rolling tool (140). The opposing end of the standard bead rolling tool (140) is received between a tire bead (8) and the wheel rim (7) for either mounting or dismounting operations. The receiver and drive assembly (110) is rotated causing the bead rolling tool (140) to move the bead (8) relative to the rim (7). For dismounting, the tire (6) is thus removed by engaging the bead rolling tool (140) and revolving the receiver and drive assembly (110) until the first bead is clear of the rim (7). The second bead (8) is then engaged by the bead rolling tool (140) with the revolving receiver and drive assembly (110) until the second bead is clear of the rim (7) and the tire (6) is removed from the wheel (4). The process for mounting the tire (6) is much the reverse operation. The bead rolling tool (140) is appropriately received by the bead rolling tool aperture (119), the appropriate bead rolling tool (140) end is positioned between the wheel (4) rim (7) and the bead (8) and the receiver and drive assembly (110) is rotated until the first bead (8) is engaged on the rim (7). The sequence is repeated with the second bead (8), the receiver and drive assembly (110) rotated until the second bead (8) is engaged on the rim (7). Air pressure is applied and the tire (6) is mounted. The tire mount/dismount module (60) is removed from the wheel (4) and the process is completed. It will be appreciated that the bead rolling tool (140) has a form readily recognized by those of ordinary skill in the tire and wheel arts providing an end for dismounting of tires and an end for mounting of tires. Thus the preferred embodiment provides an aperture which received the end of the bead rolling tool (140) which not to be used and the appropriate bead rolling tool (140) end is received between the wheel (4) rim (7) and the bead (8). An alternative embodiment will dispense with the receiver and will provide a fixture means to receive a bead rolling tool (140) or, as will be clearly recognized, the fixture means will comprise the bead rolling tool (140). The structure will provide the equivalence to the above described receiver (118) with aperture (119) and bead rolling tool (140).

Rim Adapter: The tire mount/dismount module (60) may be received at the wheel front (12) or rear (14). The base ring (80) may be formed to mate with a wheel rear (14). However the base ring (80) will be expected to be adjustable if it is to mate with both a wheel front and rear (12, 14). Optionally, an adapter may be required, for the installation of the tire mount/dismount module (60), depending on the size and style of wheel (4). In the preferred embodiment herein, a rim adapter (150) is comprised of a frame (152) composed of at least two semi-circular members having ends which are interconnected by interconnection means provided, for example, simply by tubes (154) which allow the semi-circular frame (152) members to be moved relative to the other thus enlarging or contracting the dimensions according to the size and or style of wheel (4) encountered. As seen in FIGS. 15 and 16, a lever (158) may be affixed to the tube (154) to allow ease in adjusting the relative position of the semi-circular frame (152) members. The rim adapter (150) is immovably affixed to the wheel (4). The tire mount/dismount module (60) is affixed by affixing means to the rim adapter (150), including bolts and nuts, to a rim connector (156) having apertures to receive at least one bolt and nut for interconnection with apertures at the wheel (4). The base plate assembly (70) is immovably affixed to the rim adapter (150).

Alternative embodiments of the rim adapter (150) may be composed of a unitary frame providing a single piece frame structure sized for particular wheel sizes. An additional embodiment may have the rim adapter (150) composed of multiple frame elements. One of ordinary skill in the arts will recognize that many structures will suffice to allow a Tire Mount/Dismount Module (60) to be affixed to a wheel front or rear (12, 14).

While a preferred embodiment of the present disclosure has been shown and described, it will be apparent to those skilled in the art that many changes and modifications may be made without departing from the disclosure in its broader aspects. The appended claims are therefore intended to cover all such changes and modifications as fall within the true spirit and scope of the disclosure.

I claim:

1. A tire changing and bead breaker apparatus comprising:
    a) a tire bead breaker module (10) having bead breaking means to apply pressure to both sides of a tire (6) having two sides (9), rims (7) and tire beads (8); the bead breaking means causing the tire bead (8) at each side of the tire (6) to disengage from the rim (7) of a wheel (4) having a front and a rear (12, 14);
    b) a tire mount/dismount module (60) having a receiver and drive assembly (110) rotatably affixed to a wheel (4) by affixing means; rotating means to rotate the receiver and drive assembly (110), a receiver (118) affixed to the receiver and drive assembly (110) receives a bead rolling tool (140) and positions the bead rolling tool (140) to be received between the rim (7) and the tire bead (8);
    c) the rotating means comprised of a movable rotating drive means (112) rotatably interrelated to a stationary ring gear (114); the movable rotating drive means (112) rotatably affixed to the receiver and drive assembly (110).

2. The apparatus of claim 1 further comprising:
    a) the bead breaking means comprised of at least two pressure clamps (30); each at least two pressure clamps (30) having A clamp first and second end (32, 14); the at least two pressure clamps (30) positioned such that the respective clamp first ends (32) are proximal the respective tire side (9); each at least two pressure clamps (30) having a force means to urge the respective clamp first end (32) against the respective tire side (9);
    b) the tire mount/dismount module (60) having a base plate assembly (70) immovably secured to the wheel (4) by affixing means; the receiver and drive assembly (110) rotatably affixed to the base plate assembly (70); drive means (130) to rotate said rotating means and the receiver and drive assembly (110), a frame (116) affixed to and supporting the receiver and drive assembly (110); the receiver (118) affixed to the He (116).

3. The apparatus of claim 2 further comprising:
    a) a bead pad clamp (40) affixed by affixing means proximal the respective clamp first ends (32); the bead pad clamp (40) elongated, sized and oriented to be received at a tire (6) side (9) which is generally parallel with the rim (7); each of the at least two pressure clamps (30) comprised of an elongated member (31) having the clamp first and second end (32, 34); the bead pad clamp (40) positioned proximal cach of the clamp first ends (32);

b) the wheel (4) having hands (5) and apertures; the base plate assembly (70) immovably secured to at least one wheel (4) hand (5) by at least one bolt (74) and nut (75); said at least one bolt (74) received through at least one slot (77) in frame (116) and into the at least one wheel (4) hand (5).

4. The apparatus of claim 3 further comprising:
    a) a tire bead breaker mounting bar (20) having a mounting bar first and a second end (22, 24); the at least two pressure clamps (30) composed of elongated members (31) pivotally affixed, intermediate the said clamp first and second ends (32, 34), to the mounting bar (20) such that one of said at least two pressure clamps (30) is proximal the mounting bar first end (22) and that another one of said at least two pressure clamps (30) is intermediate the pivotally affixed pressure clamp (30) proximal the mounting bar first end (22) and the mounting bar second end (24); the at least two pressure clamps (30) pivotally affixed such that the respective clamp first ends (32) oppose each other and the respective clamp second ends (34) oppose each other; force means (50) composed of an actuator (50) having means of extension and retraction; said force means (50) affixed proximal the clamp second ends (34) such that actuation of said actuator (50) causes the respective at least two pressure clamps (30) to pivot;
    b) the at least one bolt (74) comprised of a threaded "J" bolt; the movable rotating drive means (112) comprised of a drive gear rotatably interrelated to a stationary ring gear (114) comprised of a stationary ring gear; the at least one drive means (130) rotates the drive gear (112); spacing and affixing means (79) to interconnect the base plate assembly (70) and receiver and drive assembly (110); a center shaft (71) centrally positioned in relation to a concentrically related base plate assembly (70) and receiver and drive assembly (110) around which the receiver and drive assembly (110) revolve.

5. The apparatus of claim 4 further comprising;
    a) force means (50) comprised of at least one hydraulic, pneumatic or electric actuator (50) having a cylinder (52) and a piston (54); the actuator (50) affixed at the clamp second ends (34) such that the cylinder (52) is rotatably affixed proximal one of the clamp second ends (34) and the piston (54) is rotatably affixed proximal the opposing clamp second end (34); extension actuation of the at least one actuator (50) causing extension of the piston (54) causing the clamp first ends (32) to move toward each other and retraction actuation of the at least one actuator (50) causing retraction of the piston (54) causing tire clamp first ends (32) to move away from each other; actuator power means and control means provided for operation of the actuator (50); a clamp stop pill (37) intermediate the clamp first end and second end (32, 34) positioned to contact the mounting bar (20) intermediate a pivot point (25) of each of the at least two pressure clamps (30) to stop movement of the respective at least two pressure clamps (30) upon disengagement of the bead (8) allowing progression of the opposing at least two pressure clamps (30) in disengaging the bead (8) against which it bears.

6. The apparatus of claim 5 further comprising:
    a) a rim adapter 150 comprising a rim adapter frame (152) to support the tire mount/dismount module (60) when mounting dismounting tires from the rear of the wheel (4).

7. The apparatus of claim 6 further comprising:
a) the rim adapter frame (152) formed to be received at the wheel rear (14).

8. The apparatus of claim 7 further comprising:
a) the rim adapter frame (152) formed of at least two semi-circular members having ends; said ends interconnected with tubes (154) permitting adjustment of the distance between the at least two semicircular members of the rim adapter frame (152); adjustment of the position of the tubes (154) facilitated by tube adjustor levers (158); the rim adapter frame (152) interconnected with a wheel (4) by an interconnecting means.

9. The apparatus of claim 8 further comprising:
a) the means of interconnecting the rim adapter frame (152) with the wheel (4) comprised of a rim connector (156) secured to the rim adapter frame (152) where said rim connector (156) has apertures to receive at least one bolt and nut for interconnection with apertures at the wheel (4).

10. A method of tire changing and bead breaking using the apparatus of claim 1 wherein;
a) positioning the tire bead breaker module (10) at the wheel (4) having the tire (6); applying pressure to both sides of the tire (6) causing the tire bead (8) at each side of the tire (6) to disengage from a rim (7) of the wheel (4);
b) affixing the tire mount/dismount module (60), having the receiver and drive assembly (110), rotatably to the wheel (4) by the affixing means; and
c) rotating the receiver and drive assembly (10) by a rotating means; wherein the receiver (118) is affixed to the receiver and drive assembly (110), the receiver receiving the bead rolling tool (140) and wherein the bead rolling tool (140) is positioned between the rim (7) and the tire bead (8).

11. A method of tire changing and bead breaking comprising the steps of:
a) positioning a tire bead breaker module (10) at a wheel (4) having a tire (6) having two sides (9); applying pressure to both sides of the tire (6) causing a tire bead (8) at each side of the tire (6) to disengage from a rim (7) of the wheel (4);
b) affixing a tire mount/dismount module (60), having a receiver and drive assembly (110), rotatably to a wheel (4) by an affixing means; and
c) rotating the receiver and drive assembly (110) by a rotating means; wherein a receiver (118) is affixed to the receiver and drive assembly (110), the receiver comprising a bead rolling tool (140) to be positioned between the rim (7) and the tire bead (8); and wherein the rotating means comprises a movable rotating drive means (112) rotatably interrelated to a stationary ring gear (114); the movable rotating drive means (112) rotatably affixed to the receiver and drive assembly (110).

* * * * *